US012792602B2

United States Patent

Rosendahl

(10) Patent No.: US 12,792,602 B2
(45) Date of Patent: Nov. 10, 2026

(54) DECOUPLED DATABASE SEARCH SYSTEM ARCHITECTURE

(71) Applicant: MongoDB, Inc., New York, NY (US)

(72) Inventor: Kevin Rosendahl, San Francisco, CA (US)

(73) Assignee: MongoDB, Inc., New York, NY (US)

( * ) Notice: Subject to any disclaimer, the term of this patent is extended or adjusted under 35 U.S.C. 154(b) by 0 days.

(21) Appl. No.: 18/749,035

(22) Filed: Jun. 20, 2024

(65) Prior Publication Data

US 2024/0427765 A1 Dec. 26, 2024

Related U.S. Application Data

(60) Provisional application No. 63/509,357, filed on Jun. 21, 2023.

(51) Int. Cl.

| | |
|---|---|
| ***G06F 16/00*** | (2019.01) |
| ***G06F 16/22*** | (2019.01) |
| ***G06F 16/2453*** | (2019.01) |
| ***G06F 16/2455*** | (2019.01) |
| ***G06F 16/2458*** | (2019.01) |
| ***G06F 16/25*** | (2019.01) |
| ***G06F 16/27*** | (2019.01) |

(52) U.S. Cl.

CPC .......... *G06F 16/2453* (2019.01); *G06F 16/22* (2019.01); *G06F 16/2228* (2019.01); *G06F 16/24552* (2019.01); *G06F 16/2471* (2019.01); *G06F 16/256* (2019.01); *G06F 16/278* (2019.01)

(58) Field of Classification Search

None

See application file for complete search history.

(56) References Cited

U.S. PATENT DOCUMENTS

| | | | | |
|---|---|---|---|---|
| 6,490,589 | B1 | 12/2002 | Weider | |
| 7,761,407 | B1 * | 7/2010 | Stern | G06F 16/2237 707/602 |
| 9,294,391 | B1 * | 3/2016 | Mostert | G06F 16/95 |
| 10,303,564 | B1 * | 5/2019 | Gupta | G06F 11/1474 |
| 11,734,304 | B2 * | 8/2023 | Cruanes | A61F 5/566 707/770 |

(Continued)

OTHER PUBLICATIONS

[No Author Listed], MongoDB Package Components. Database Manual. 2025. 198 Pages.

(Continued)

*Primary Examiner* — Hasanul Mobin

(74) *Attorney, Agent, or Firm* — Wolf, Greenfield & Sacks, P.C.

(57) ABSTRACT

Described herein are embodiments of a database search system. In the architecture of the database search system, the database search system is decoupled from the management components of a distributed database for which the database search system executes queries. The decoupled architecture of the database search system allows the database search system to utilize its own processing and storage hardware that is separate from that of the management components of the distributed database system. The decoupled architecture thus allows for processing and storage optimizations for searching that lead to improved availability and query execution performance by the database search system.

20 Claims, 9 Drawing Sheets

(56) References Cited

U.S. PATENT DOCUMENTS

| | | | | |
|---|---|---|---|---|
| 11,892,996 | B1 * | 2/2024 | Anwar | G06F 16/2255 |
| 12,105,692 | B1 * | 10/2024 | Kumar | G06F 16/2272 |
| 2005/0278195 | A1 * | 12/2005 | Getz | G06Q 10/10<br>705/2 |
| 2008/0016028 | A1 * | 1/2008 | Wilding | G06F 16/2343 |
| 2009/0271379 | A1 * | 10/2009 | Bakalash | G06F 16/30 |
| 2010/0287049 | A1 * | 11/2010 | Rousso | G06F 16/9535<br>707/723 |
| 2012/0095958 | A1 * | 4/2012 | Pereira | G06F 16/435<br>707/609 |
| 2012/0102006 | A1 * | 4/2012 | Larson | G06F 16/27<br>707/703 |
| 2013/0275467 | A1 | 10/2013 | Lee | |
| 2013/0325851 | A1 * | 12/2013 | Crudele | G06F 16/438<br>707/722 |
| 2014/0279920 | A1 * | 9/2014 | Madhavarapu | G06F 11/1458<br>707/649 |
| 2014/0330785 | A1 | 11/2014 | Isherwood et al. | |
| 2016/0055248 | A1 | 2/2016 | Goel et al. | |
| 2017/0103094 | A1 | 4/2017 | Hu et al. | |
| 2018/0004801 | A1 * | 1/2018 | Burchall | G06F 16/2379 |
| 2018/0150368 | A1 * | 5/2018 | Lee | H04L 67/1097 |
| 2018/0314750 | A1 | 11/2018 | Merriman et al. | |
| 2020/0201881 | A1 * | 6/2020 | Cruanes | A61F 5/566 |
| 2020/0311092 | A1 * | 10/2020 | Thomas | G09B 7/02 |
| 2021/0303572 | A1 * | 9/2021 | Ouyang | H04L 67/125 |
| 2023/0177054 | A1 * | 6/2023 | Martin | G06F 16/24561<br>707/610 |
| 2024/0427765 | A1 | 12/2024 | Rosendahl | |

OTHER PUBLICATIONS

[No Author Listed], Improve Atlas Search Performance. MongoDB, Inc. 2025. 4 pages.

* cited by examiner

DECOUPLED DATABASE SEARCH SYSTEM ARCHITECTURE

RELATED APPLICATIONS

This application claims the benefit under 35 U.S.C. § 119(e) of U.S. Provisional Application Ser. No. 63/509,357, filed Jun. 21, 2023, and entitled "DECOUPLED DATABASE SEARCH SYSTEM ARCHITECTURE," which is hereby incorporated herein by reference in its entirety.

BACKGROUND

A distributed database (DB) stores data across multiple different storage devices. The different storage devices may be interconnected through a computer network. The distributed database may be managed by a database management system. The database management system may interact with client devices. The client devices may transmit queries to the database management system for data stored in the database. For example, the client devices may be executing an application that transmits queries to the database management system to create, read, update, and/or delete data stored in the distributed database.

SUMMARY

Conventional database search architecture is ill-equipped to serve the most demanding and fastest-growing workloads. Given the size of the addressable market and the externalities that impact timing, issues such as read availability, resource contention, and coupled scaling offer a strong incentive development of a new architecture to support Atlas Search. Users rely on a response to every query to support their mission-critical workloads. If a query manager (e.g., a mongot instance) is down, then a database manager (e.g., a mongod instance) cannot query it. In conventional systems, it is not easy to solve this problem because operations are isolated to a single node that executes both the mongot and mongod instances. If the mongot instance is down, there is no mechanism to reroute the query to a healthy mongot instance. Example applications that may be affected are medical and financial records reconciliation, media search, recommenders, and other workloads that are high query throughput, have unique networking related challenges, or dynamically serve content based on search results.

In a database system, a database search system (e.g., Apache Lucene) scales differently than a database (e.g., a MongoDB database) storing data. The factors for partitioning or scaling up vary substantially because search workloads and data storage workloads are often different and would ideally be scaled differently. For high indexing throughput, a database search system frequently parallelizes the indexing process through sharding and/or scaling vertically. For high query throughput, database search systems typically add more small replicas. For example, while there may be some similarities between Apache Lucene and MongoDB, details like the ~2.1 billion document limit in a single Lucene shard, limitations of the JVM beyond 30 GB, the immutable nature of Lucene segments present a few areas that suggest distinct needs for the two systems.

When a database and a search system for the database are implemented on the same hardware, the result is a poor user experience. The search and database system have to be sharded for the lowest common denominator of the other. The search system will often be that denominator because of the confluence of MongoDB's recommendation of denormalization and the 2.1 billion document limit in Lucene, including a separate Lucene document for each nested document in an array. Thus, a MongoDB database may need to be sharded due to a corresponding database search system. In other cases, the database search system may need to be sharded due to the database. If the database search system is not sharded, it is likely to experience issues such as increased latency due to the scatter-gather nature of a search query. Some embodiments described herein allow a database search system and a database to be partitioned independently based on their respective needs.

Described herein are embodiments of a decoupled database search system. In the architecture of the database search system, the database search system is decoupled from the management components of a distributed database for which the database search system executes queries. The decoupled architecture of the database search system allows the database search system to utilize its own processing and storage hardware that is separate from that of the management components of the distributed database system. The decoupled architecture thus allows for processing and storage optimizations for searching that lead to improved availability and query execution performance by the database search system.

Some embodiments provide a system for searching for data in a distributed database. The distributed database comprises a plurality of database management nodes each managing respective data stored in the distributed database. The system comprises computer hardware different from computer hardware of the distributed database. The computer hardware of the system comprises: at least one memory configured to store at least one index for data managed by the plurality of database management nodes, the at least one index comprising values of at least one field in the data managed by the plurality of databasc management nodes; and at least one processor configured to execute a plurality of components, the plurality of components comprising: a plurality of query management nodes each configured to: receive a query for data stored in the distributed database; execute, using the at least one index, the query to identify data targeted by the query stored in the distributed database; transmit, to at least one database management node of the plurality of database management nodes, information indicating the data requested by the query for locating the identified in the distributed database; a query routing module configured to: receive queries from the plurality of database management nodes; and route each of the queries to at least one of the plurality of query management nodes for execution.

Some embodiments provide a method for searching for data in a distributed database, the distributed database comprising a plurality of database management nodes managing respective data stored in the distributed database. Each of the plurality of database management nodes managing respective data stored in the distributed database. The method comprises: using at least one processor of computer hardware separate from computer hardware of the distributed database to perform: receiving queries from the plurality of database management nodes; routing each of the queries to at least one of a plurality of query management nodes; executing, using the at least one query management node, the queries to identify data requested by the queries stored in the distributed database; and transmitting, to at least one of the plurality of database management nodes, information indicating the identified data requested by the query for locating the identified data in the distributed database.

Some embodiments provide a non-transitory computer-readable storage medium storing instructions. The instructions, when executed by at least one processor, causes the at least one processor to perform a method of searching for data in a distributed database. The at least one processor is separate from computer hardware of the distributed database. The method comprises: receiving queries from a plurality of database management nodes of the distributed database system; routing each of the queries to at least one of a plurality of query management nodes; executing, using the at least one query management node, the queries to identify data requested by the queries that is stored in the distributed database; and transmitting, to at least one of the plurality of database management nodes, information indicating the identified data requested by the query for locating the identified data in the distributed database.

Some embodiments provide a distributed database system. The system comprises first computer hardware comprising: a datastore storing data of the distributed database system; and at least one processor configured to: receive, from a client device, a query requesting data from the datastore; transmit the query to a database search system for execution, the database search system comprising second computer hardware separate from the first computer hardware; after transmitting the query to the database search system: receive, from the database search system, information indicating data identified by the database search system from execution of the query; retrieve, from the datastore, using the information received from the database search system, the data identified by the database search system from execution of the query; and transmit, to the client device, the data retrieved from the datastore.

Some embodiments provide a method for processing queries by a distributed database system, the distributed database system comprising first computer hardware comprising a datastore storing data of the distributed database system. The method comprises using at least one processor of the first computer hardware to perform: receiving, from a client device, a query requesting data from the datastore; transmitting the query to a database search system for execution, the database search system comprising second computer hardware separate from the first computer hardware; after transmitting the query to the database search system: receiving, from the database search system, information indicating data identified by the database search system from execution of the query; retrieving, from the datastore, using the information received from the database search system, the data identified by the database search system from execution of the query; and transmitting, to the client device, the data retrieved from the datastore.

Some embodiments provide a non-transitory computer-readable storage medium storing instructions that, when executed by a processor, cause the processor to perform a method for processing queries by a distributed database system. The distributed database system comprises first computer hardware comprising a datastore storing data of the distributed database system. The method comprises: receiving, from a client device, a query requesting data from the datastore; transmitting the query to a database search system for execution, the database search system comprising second computer hardware separate from the first computer hardware; after transmitting the query to the database search system: receiving, from the database search system, information indicating data identified by the database search system from execution of the query; retrieving, from the datastore, using the information received from the database search system, the data identified by the database search system from execution of the query; and transmitting, to the client device, the data retrieved from the datastore.

The foregoing is a non-limiting summary.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1:
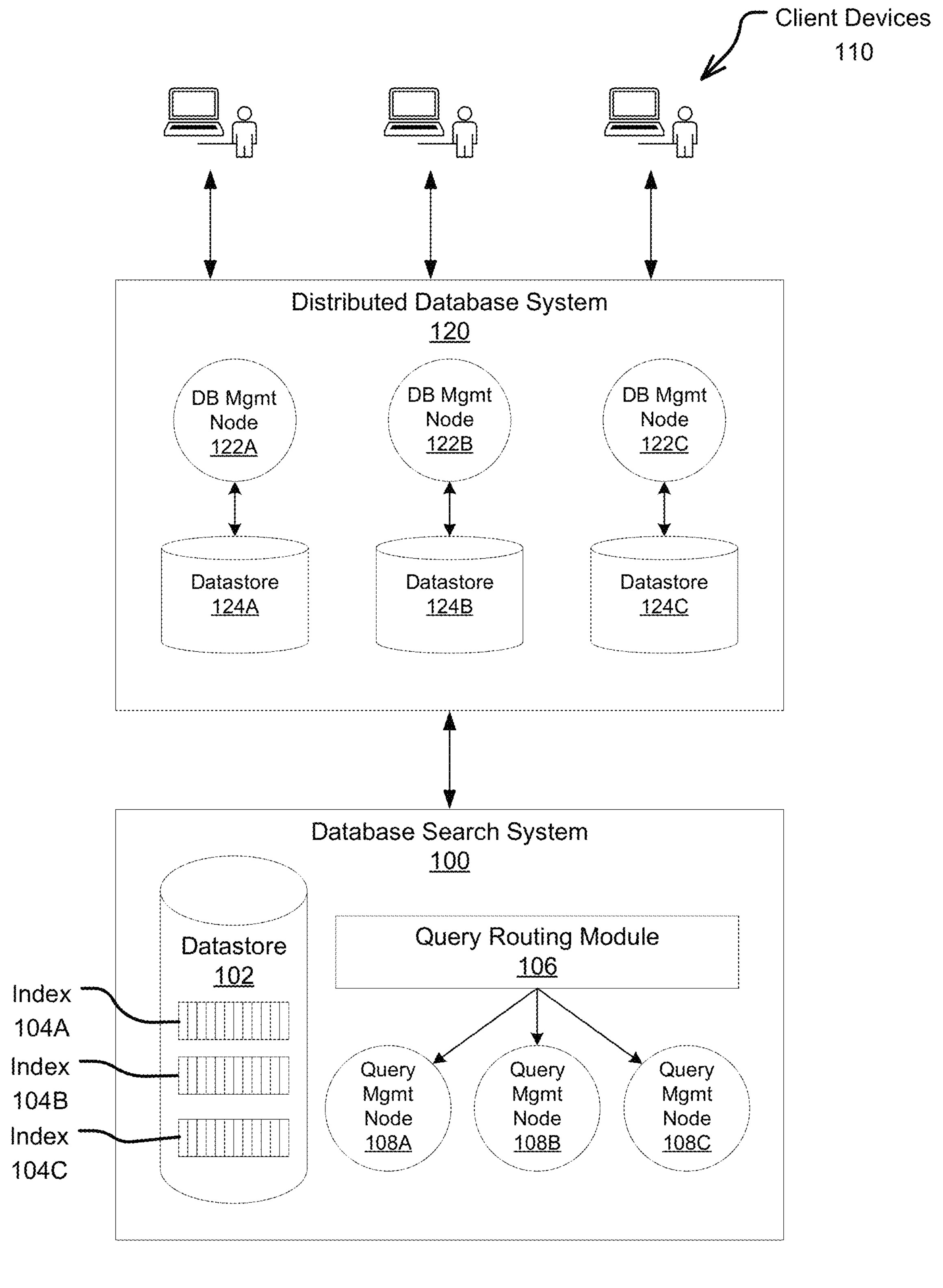
FIG. 1 shows a diagram of an example environment in which a database search system may be used, according to some embodiments of the technology described herein.

Described herein are embodiments of a database search system architecture that results in improved query execution efficiency and reliability.

In a conventional database search system architecture, the database search system is closely coupled with a database for which the database search system would execute queries. The database search system is typically implemented using the same computer hardware as the database. As an illustrative example, a database may include multiple database management nodes that manage data in the database. The database management nodes may receive queries, update data, and/or generate responses to the queries by aggregating data. The database may also include storage hardware in which data of the database is stored. A database search system would be executed using the same processing hardware as the database management nodes of the database and would store its search indexes using the same storage hardware in which the data of the database is stored. For example, in a MongoDB database system, a database management node would execute both a mongod instance for database management and a mongot instance for query execution.

The inventors recognized that conventional database search system architecture limits the efficiency and reliability of the system. In conventional architecture, the database system executes queries using the same processing hardware as the database system uses for data management components (e.g., for storing and retrieving data). This often requires limiting the processing capacity allocated to the database search system for the execution of queries to ensure the availability of the database (e.g., for a client application). Moreover, the inventors recognized that the storage hardware for storing data in the database is not optimized for maximizing the efficiency of query execution. Executing a query involves a large number of sequential accesses to disk storage. Storage and processing hardware of a database may not be optimized for a large number of sequential accesses to disk storage.

To address the above-described limitations in conventional database search systems, the inventors developed a database system architecture in which the database search system is decoupled from the data management components. The architecture allows the database search system to be implemented using processing and storage hardware that is different from that of the data management components. Thus, processing capacity in processing hardware of the database search system components need not be limited due to the availability of the database storage components. The processing hardware may be selected to optimize the execution of queries. Moreover, the architecture allows search indexes to be stored in storage hardware (e.g., memory) tailored to improve query execution efficiency. For example, the storage hardware for indexes may allow for more efficient sequential access to disks storing an index and enable faster utilization of data stored as indexes given its organization on disk.

Accordingly, described herein are embodiments of a database search system for searching for data in a distributed database. The distributed database includes computer hardware hosting multiple database management nodes of the distributed database (e.g., for managing data in respective portions of data of the distributed database). The database search system comprises computer hardware separate from the computer hardware of the distributed database. The computer hardware of the database search system includes its own processor(s) and memory. The database search system receives queries for data stored in the distributed database (e.g., from the distributed database management nodes). The database search system routes a given query to one of multiple query management nodes for execution. A query management node executes a query for data by searching an index stored in the memory of the database search system to identify data targeted by the query. The database search system may transmit information indicating the identified data to a distributed database management node for use in aggregating data to respond to the query.

Some embodiments provide a system for searching for data in a distributed database. The distributed database comprises a plurality of database management nodes. Each of the plurality of database management nodes manages respective data stored in the distributed database (e.g., a replica and/or partition of data stored in the database). For example, the plurality of database management nodes may be configured to execute mongod instances in a MongoDB database system. The system comprises computer hardware separate from computer hardware of the distributed database. The computer hardware includes storage hardware and processing hardware. The computer hardware includes memory configured to store one or more indexes for data managed by the plurality of database management nodes. The one or more indexes include entries storing values of at least one field in the data (e.g., collection of documents) managed by the plurality of database management nodes. The computer hardware includes one or more processors configured to execute a plurality of components. The plurality of components comprises a plurality of query management nodes. Each of the query management nodes is configured to: receive a query for data stored in the distributed database; execute, using an index, the query to identify data targeted by the query stored in the distributed database; and transmit, to at least one database management node of the plurality of database management nodes, information indicating the data requested by the query for locating the identified in the distributed database. The plurality of components further comprises a query routing module configured to: receive queries from the plurality of database management nodes; and route each of the queries to at least one of the plurality of query management nodes for execution.

A node may refer to a compute unit comprising one or more processors and memory. The node may further include communication hardware (e.g., network communication hardware). In some embodiments, each of the plurality of query management nodes may be a virtual machine (VM) configured to execute a query. In some embodiments, the at least one virtual machine is at least one compute-optimized VM (e.g., optimized for execution of queries). In some embodiments, each of the plurality of query management nodes may comprise a respective processor and memory. In some embodiments, multiple query management nodes may comprise a portion of processing capacity of a single processor.

In some embodiments, the plurality of components further comprises an index construction module configured to: construct the at least one index stored in the at least one memory; and update the at least one index based on updates to values of the at least one field in the data managed by the plurality of database management nodes (e.g., by accessing a record of data updates executed by a database management node).

In some embodiments, the query routing module is further configured to perform load balancing of query processing across the plurality of query management nodes. In some embodiments, the query routing module is further configured to: receive a first query from a first database management node of the plurality of database management nodes; identify a first one of the plurality of query management nodes to execute a first query; determine that the first execution module does not have a processing bandwidth designated for execution of the first query; and route the first query to a second one of the plurality of query management nodes in response to determining that the first execution module does not have the processing bandwidth designated for execution of the first query.

In some embodiments, the distributed database stores a plurality of replicated datasets (e.g., replica sets) each managed by a respective one of the plurality of database management nodes. In some embodiments, the distributed database stores a plurality of data partitions (e.g., shards) each managed by a respective one of the plurality of database management nodes. In some embodiments, the processor(s) of the system comprises a plurality of processors distributed across multiple geographic regions, and each of the query management nodes is configured for execution by a processor in a respective one of the multiple geographic regions.

FIG. 1 shows a diagram of an example environment in which a database search system 100 may be used, according to some embodiments of the technology described herein. As shown in the example embodiment of FIG. 1, the environment includes a distributed database system 120 in communication with multiple client devices 110. The client devices 110 may transmit queries to the distributed database system 120 (e.g., to create, read, update, and/or delete data stored by the distributed database system 120). The distributed database system 120 may transmit queries to the database search system 100 to search for data targeted by the query. The database search system 100 may identify data targeted by the query and transmit an indication of the identified data to the distributed database system 120 (e.g., for generating a query response to transmit to the client devices).

As shown in the example embodiment of FIG. 1, the database search system 100 includes a datastore 102 storing indexes 104A, 104B, 104C, a query routing module 106, and query management nodes 108A, 108B, 108C. The database search system 100 may be configured to receive queries for execution by the distributed database system 120. For example, the database search system 100 may execute queries on behalf of the distributed database system 120 (e.g., to decouple data search operations from the distributed database system 120). In some embodiments, the database search system 100 may receive queries for execution through an application program interface (API).

In some embodiments, the datastore 102 may comprise storage hardware. The storage hardware may have memory for storage of data (e.g., to store indexes 104A, 104B, 104C). For example, the datastore 102 may comprise one or more hard drives for storing data. In some embodiments, the storage hardware of the datastore 102 may be optimized for the execution of searches. Searching for data may involve multiple sequential accesses to disk storage of the storage hardware. The storage hardware of the datastore 102 may be selected to mitigate the latency associated with searching for data on a storage disk. In some embodiments, the storage hardware of the datastore 102 may comprise one or more storage disks that are co-located with the processing hardware of the database search system 100. For example, the storage disk(s) may be in the same chassis as the processing hardware. By being co-located with the processing hardware, the latency associated with accessing the disk(s) may be less than if the disk(s) were located remotely from the processing hardware. In some embodiments, data may be stored in the memory of the datastore 102 to optimize the execution of queries. For example, entries in an index may be stored sequentially in memory to allow efficient traversal of the entries when executing a search.

In some embodiments, the datastore 102 is separate from datastores 124A, 124B, 124C of the distributed database system 120. Accordingly, the datastore 102 has storage hardware that is different from the storage hardware of the datastores 124A, 124B, 124C. Accordingly, the storage hardware of the datastore 102 may be different from that of the datastores 124A 124B, 124C of the distributed database system 120. For example, the hard drive(s) of the datastore 102 may be a different model from the hard drive(s) of the datastores 124A, 124B, 124C. Moreover, the storage hardware of the datastore 102 may be configured differently from that of the datastores 124A, 124B, 124C of the distributed database system 120. For example, the memory of the datastore 102 may be optimized execution of queries.

As illustrated in FIG. 1, the datastore 102 stores indexes 104A, 104B, 104C. An index may be a data structure that organizes data into an easily searchable format. The database search system 100 may be configured to use the indexes 104A, 104B, 104C to search for data. In some embodiments, each of the indexes 104A, 104B, 104C may store multiple entries that each store value(s) of one or more fields included in documents of a collection. For example, the indexes 104A, 104B, 104C may each store identical copies of field values from documents in a collection. In some embodiments, an entry may further include metadata about the field value(s) of the entry. For example, an entry may include metadata indicating a position of a field in a document.

In some embodiments, the database search system 100 may be configured to generate an index based on an index definition. For example, an index definition may be specified in a file or through a graphical user interface (GUI). In some embodiments, an index definition may specify fields to be indexed. For example, the distributed database system 120 may be configured to store data in fields of storage units called "documents". In some embodiments, an index definition may specify which of the fields in the documents to index. The index definition may further specify instructions that specify how to generate index terms from a value of a field. For example, the index definition may include a tokenizer to extract tokens from a value of a field and filters applied to the tokens to generate index terms.

In some embodiments, the database search system 100 may be configured to generate an index for each of multiple collections of data stored in the distributed database system 120. In one example, the distributed database system 120 may store data in documents (e.g., binary encoded JavaScript Object Notation (BSON) documents). The distributed database system 120 may organize sets of documents into collections. Thus, the distributed database system 120 may store multiple collections of documents. Each of the indexes 104A, 104B, 104C may correspond to a respective collection of documents. An index for a collection of documents may include values of one or more indexed fields of documents in the collection (e.g., that were specified in an index definition). In some embodiments, an index may be associated with a respective portion of data stored by the distributed database system 120. In one example, data may be stored across multiple portions called "shards". In this example, the database search system 100 may store an index for each shard. For example, each of the indexes 104A, 104B, 104C may index data in a respective shard.

In some embodiments, the database search system 100 may be configured to update the indexes 104A, 104B, 104C. The database search system 100 may be configured to update the indexes 104A, 104B, 104C as data of the distributed database system 120 is updated (e.g., by an application that uses the distributed database system 120 to store application data). For example, the database search system 100 may add entries to an index as documents are added to a collection. In some embodiments, the database search system 100 may be configured to periodically update the indexes 104A, 104B, 104C (e.g., every 1-24 hours, every 1-7 days, or any other suitable time period). The database search system 100 may be configured to periodically scan datastores of the distributed database system 120 to access updates to the indexed field(s). For example, the database search system 100 may access a change stream indicating a current state of documents in a collection and update a respective index to reflect the current state of the documents.

In some embodiments, each of the query management nodes 108A, 108B, 108C may be configured to use a respective one of the indexes 104A, 104B, 104C to execute a query (e.g., routed to the query management node by the query routing module 106). For example, each of the query management nodes 108A, 108B, 108C may execute a Java Web process for execution queries using a respective index. A query management node 108A may be configured to: (1)

receive a query; and (2) process the query to identify data (e.g., documents) matching the query. The query management node may use search variables included in the query to identify entries in a respective index. The search variables may indicate search criteria and the query management node may identify entries in the respective index that meet the search criteria. The query management node may output an indication of data that meets the search criteria. For example, the query management node may output identifier (s) of one or more documents that meet the search criteria (e.g., for generating a query response for a client).

In some embodiments, each of the query management nodes 108A, 108B, 108C may use processing hardware separate from the processing hardware of the distributed database system 120. For example, the query management nodes 108A 108B 108C may include one or more virtual machines separate from those used by the distributed database system 120. Accordingly, the processing hardware may be selected for maximizing search performance. In some embodiments, the processing hardware may be selected to optimize computations for execution of a query. For example, the query management nodes 108A, 108B, 108C may comprise the Amazon EC2 C7g, C7gn, C6i, Coin, C6a, C6g, C6gn, C, C5n, C5a, or C4 processors. In some embodiments, the type of processing hardware of the query management nodes 108A, 108B, 108C may be different from the processing hardware of the distributed database system 120.

In some embodiments, as the processing hardware of the query management nodes 108A, 108B, 108C is separate from the processing hardware of the distributed database system 120, the available processing bandwidth available to the components is not limited by the operation of the distributed database system 120. Accordingly, the processing hardware may not be limited for purposes of ensuring the availability of the distributed database system 120. The additional computation capacity allows the query management nodes 108A, 108B, 108C to execute queries more quickly and, in turn, for the distributed database system 120 to generate query responses for client devices more quickly.

In some embodiments, a query management node may include an automation agent that is configured to write out its configuration (which is the same for every agent in a project) to a local file on disk. That file (with the same permissions as the key file) may contain key file contents.

In some embodiments, the query routing module 106 of the database search system 100 may be configured to route queries received from the distributed database system 120. The query routing module 106 may be configured to: (1) receive queries from the distributed database system 120; and (2) route each of the queries to a query management node for execution. In some embodiments, the query routing module 106 may be configured to route a query to a query management node by: (1) identifying a query management node that is associated with a partition (e.g., a shard) storing targeted by the query; and (2) transmitting query to the identified query management node. The identified query management node may be configured to use an index storing indexed field values from data in the shard to execute the query.

In some embodiments, the query routing module 106 may be configured to load balance query processing among the query management nodes 108A, 108B, 108C. In some embodiments, the query routing module 106 may be configured to: (1) determine whether a query management node identified to execute a query is available; (2) transmit the query to the identified query management node when it is determined that the identified query management node is available; and (3) transmit the query to another query management node when it is determined that the query management node is unavailable. The query routing module 106 may monitor the health of the query management nodes 108A, 108B, 108C to determine their availability. For example, a query management node originally identified for the execution of a query by the query routing module 106 may be unavailable due to a network error or power loss of processing hardware executing the module. In this case, the query routing module 106 may transmit the query to another query management node.

In some embodiments, the query routing module 106 may be configured to distribute query processing across the query management nodes 108A, 108B, 108C. The query routing module 106 may be configured to distribute queries to target a uniform distribution of query processing across the query management nodes 108A, 108B, 108C. For example, the query routing module 106 may be configured to distribute the queries among the query management nodes 108A, 108B, 108C to balance the number of queries executed by each query management node in a given period of time. As another example, the query routing module 106 may distribute queries among the query management nodes 108A, 108B, 108C to reduce latency in generating a response. The query routing module 106 may determine that a query management node identified for the execution of a query is occupied with another query and, in response, transmit the query to another query management node. This allows the database search system 100 to provide a response to the query without a delay from awaiting the completion of execution of the other query by the identified query management node.

As shown in FIG. 1, the distributed database system 120 includes database management nodes 122A, 122B, 122C associated with respective datastore 124A, 124B, 124C. In some embodiments, the distributed database system 120 may be a cloud-based database with distributed computing and storage resources. For example, each of the database management nodes 122A, 122B, 122C may be executed by a respective set of one or more servers. The datastores 124A, 124B, 124C may comprise geographically distributed storage hardware (e.g., in geographically different data centers). For example, each of the datastores 124A, 124B, 124C may comprise one or more hard drives or portions thereof located in a respective data center.

In some embodiments, each of the database management nodes 122A, 122B, 122C may be associated with a respective one of the datastores 124A, 124B, 124C. The database management nodes 122A, 122B, 122C may be configured to manage data in the datastores 124A, 124B, 124C. For example, a database management node may be configured to manage the execution of create, read, update, and delete operations for its associated database. In some embodiments, the datastores 124A, 124B, 124C may form a replica set in which each of the datastores stores a respective replica of a dataset (e.g., a collection of documents). In one implementation, one of the database management nodes 122A, 122B, 122C may be a primary database management node and the other database management nodes may be secondary database management nodes. The secondary database management nodes may replicate data in their data stores from the data store of the primary database management node. An example replica set architecture that may be used by the distributed database system 120 is described with reference to FIG. 3 of U.S. Pat. No. 10,262,050, which is incorporated by reference herein. In some embodiments, the distributed database system 120 may use a sharded architecture. Each of the datastores 124A, 124B, 124C may store a respective shard of data. The shards may collectively represent data of the distributed database system 120. Each of the database management nodes 122A, 122B, 122C may be a set of one or more shard servers that manage the data of a respective shard. An example sharded architecture that may be used by the distributed database system 120 is described with reference to of FIG. 5 of U.S. Pat. No. 10,262,050, which is incorporated by reference herein.

In some embodiments, the database management nodes 122A, 122B, 122C may be configured to communicate with the client devices 110. The database management nodes 122A, 122B, 122C may be configured to receive queries from the client devices 110. For example, a query may be received through a graphical user interface (GUI) or through a command terminal. A query may specify a request for data stored in a datastore associated with the database management node. The database management nodes 122A, 122B, 122C may be configured to use the database search system 100 to perform a search. The database management nodes 122A, 122B, 122C may be configured to transmit queries to the database search system 100 for execution. The database management nodes 122A, 122B, 122C may be configured to receive results from the execution of the queries. In some embodiments, the database management nodes 122A, 122B, 122C may be configured to receive information indicating data identified from executing queries. For example, the database management nodes 122A, 122B, 122C may receive, from the database search system 100, identifiers (e.g., values of an "_Id" field) of documents requested in a query. In some embodiments, the database management nodes 122A, 122B, 122C may be configured to further receive metadata in addition to the information indicating the data identified from executing the queries.

In some embodiments, the database management nodes 122A, 122B, 122C may be configured to use query execution results obtained from the database search system 100 to aggregate search results. The database management nodes 122A, 122B, 122C may each be configured to: (1) receive an indication of data identified by the database search system 100 by executing a query; (2) receive the indication of the data to aggregate the data; and (3) output the aggregated data to a client device. For example, a database management node may transmit a query for execution to the database search system 100 and receive a response communication indicating identifier(s) (e.g., key(s)) for one or more documents stored in a datastore managed by the database management node. In this example, the database management node may look up the document(s) using the identifier(s) to aggregate the document(s) and transmit the aggregated document(s) to a client device from which the query was received.

In some embodiments, each of the database management nodes 122A, 122B, 122C may be configured to manage a respective portion of data. For example, each of datastores 124A, 124B, 124C may be a shard of data of the distributed database system 120. A query may request data from one portion or multiple portions of data. Each of the database management nodes 122A, 122B, 122C may aggregate data from its corresponding portion (e.g., using information identifying the data received from the database search system 100). The distributed database system 120 may combine data from multiple different portions (e.g., multiple shards) to provide an output to a client device.

As illustrated in the example embodiment of FIG. 1, the distributed database system 120 receives queries from client devices 110. For example, the client devices may transmit queries to the distributed database system 120 through an application program interface (API). Each of the client devices 110 may be any suitable computing device. For example, a client device may be a desktop computer, a mobile device (e.g., a laptop, smartphone, tablet, wearable device, or other suitable mobile device), a server (e.g., executing a client application that uses the distributed database system 120 to store application data), or other suitable computing device. In some embodiments, a client device may transmit queries based on input provided by a user through a graphical user interface (GUI). In some embodiments, a client device may transmit query commands (e.g., entered through a shell).

Figure 2:
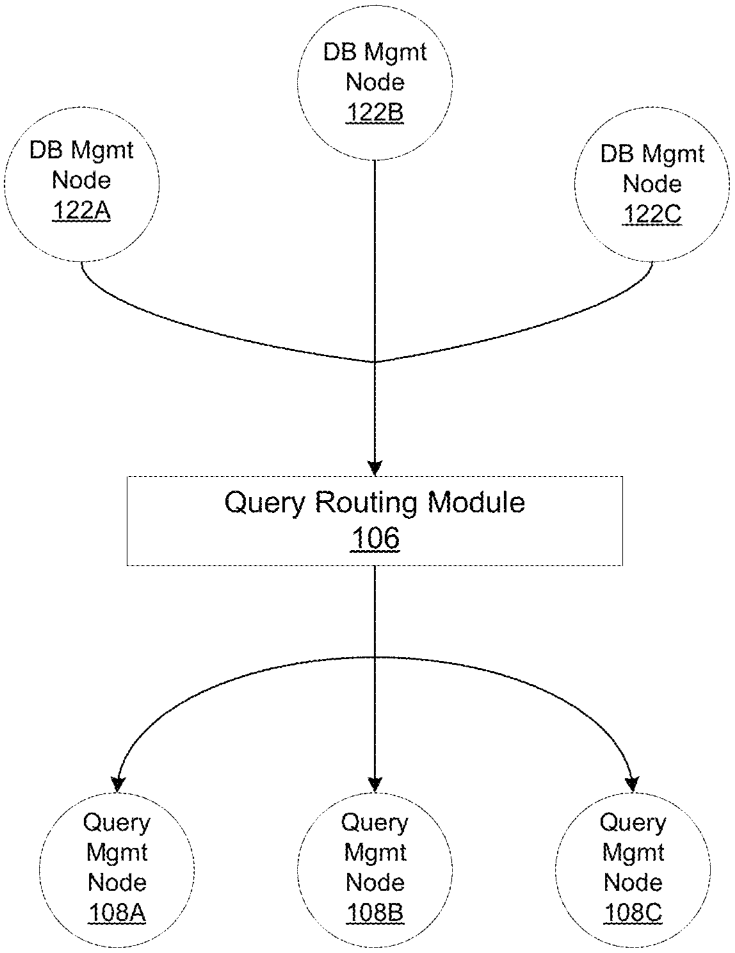
FIG. 2 illustrates routing of queries to query management nodes by the database search system, according to some embodiments of the technology described herein.

FIG. 2 illustrates routing of queries to query management nodes 108A, 108B, 108C by the query routing module 106 the database search system, according to some embodiments of the technology described herein. As illustrated in FIG. 2, the query routing module receives queries from the database management nodes 122A, 122B, 122C of the distributed database system 120. In some embodiments, the database management nodes 122A, 122B, 122C may be database management nodes of a replica set. Thus, each of the database management nodes 122A, 122B, 122C may host a replica of a dataset.

In some embodiments, the query management nodes 108A, 108B, 108C may be designated for the replicate set of database management nodes 122A, 122B, 122C. For example, the query management nodes 108A, 108B, 108C may provide high availability and resource isolation for execution of queries. In some embodiments, each of the query management nodes 108A, 108B, 108C may be isolated from one another. For example, each of the query management nodes 108A, 108B, 108C may run on its own isolated virtual machine. In some embodiments, the number of query management nodes and the amount of resources provisioned for each query management node can be configured independently of the distributed database system 120.

In some embodiments, a given query management node may not have a static mapping to a single distributed database management node for replication. A query management node may change the database management node it queries for initial sync and indexing queries or change streams over the course of its lifetime for various reasons, including but not limited to the database management node no longer existing.

In some embodiments, the query routing module 106 may load balance queries received from the database management nodes 122A, 122B, 122C. For example, the query routing module 106 may: (1) determine an available query management node; and (2) transmit a new query to the available query management node. In some embodiments, the query routing module 106 may load balance queries by evenly distributing query execution load across the query management nodes 108A, 108B, 108C. In some embodiments, if a query management node is unavailable to execute a query, the query routing module 106 may transmit the query to another query management node. The query routing module 106 may health check the query management nodes 108A, 108B, 108C to determine which query management node(s) are available. The query routing module 106 may transmit a query to one of the available query management node(s). In some embodiments, the query routing module 106 may determine whether a query management node failed to execute a query (e.g., due to a network error). The query routing module 106 may route the query to another query management node to retry execution of the query. For example, if the query routing module 106 transmitted a query to the query management node 108A for execution and detected a network error that caused execution of the query to fail, the query routing module 106 may subsequently transmit the query to the query management node 108B to attempt execution. As another example, the query routing module 106 may cause the query management node 108A to retry execution of the query.

In some embodiments, the query management nodes 108A, 108B, 108C may transmit indications of data updates performed from execution of a query to the database management nodes 122A, 122B, 122C. For example, in a MongoDB system, the query management nodes 108A, 108B, 108C may provide a change stream (e.g., $changeStream) of updates (e.g., to one or more collections of the MongoDB system). In some embodiments, the indication of updates may be provided to a software application (e.g., for use in execution of the software application). For example, the indication of updates may be transmitted by a query management node to a database management node to notify a software application of the updates.

In some embodiments, the distributed database system 120 may span multiple geographic regions. In such embodiments, each geographic region may have a set of dedicated query management nodes. For example, the query management nodes 108A, 108B, 108C may be dedicated for a particular geographic region (e.g., a country, continent, city, state, or other geographic region). Queries received from a particular region may be routed by the query routing module 106 among the set of query management nodes configured for the region. These query management nodes may, for example, comprise computer hardware within the geographic region. This may facilitate reduction in latency that would otherwise result from transmission of queries and results between database management nodes and query management nodes that are not in the same geographic region.

The query routing module 106 may be implemented using suitable computer hardware of the database search system 100. In some embodiments, the query routing module 106 may be a cloud-based system. The query routing module 106 may be executed using resources instantiated by a cloud resource management system. For example, the query routing module 106 may be executed by a virtual machine instantiated for the query routing module 106.

In some embodiments, the distributed database system 120 may have a sharded architecture. Thus, data may be distributed among multiple data partitions that are stored on different storage hardware (e.g., different servers). In some embodiments, each of the query management nodes 108A, 108B, 108C may be configured to index data for a particular one of the data partitions. For example, query management node 108A may index a first data partition, query management node 108B may index a second data partition, and query management node 108C may index a third data partition. Each data partition may, for example, store a collection of documents or a portion thereof. The query routing module 106 may route a query for data to a query management node that indexes a data partition (e.g., a data collection or portion thereof) storing data targeted by the query.

Figure 3:
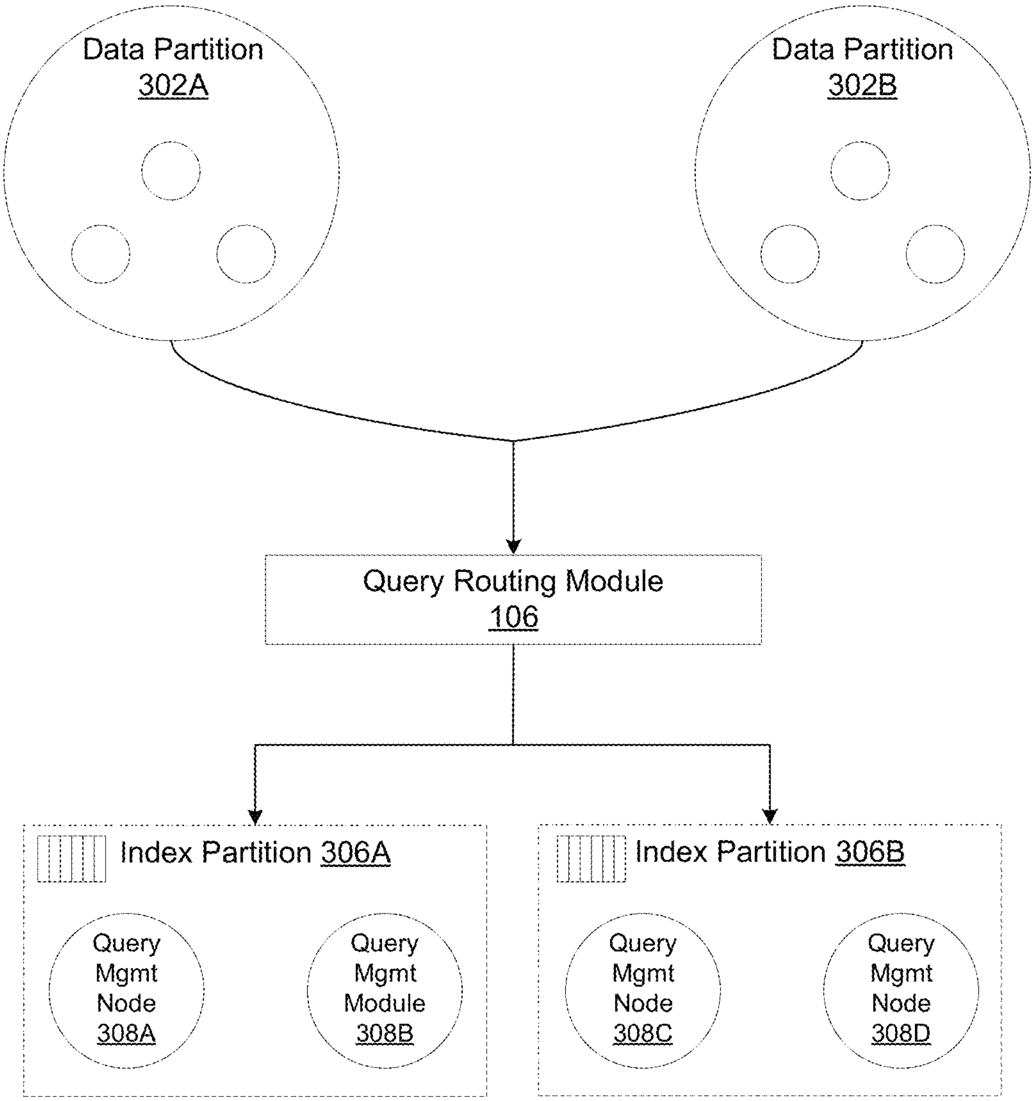
FIG. 3 illustrates operation of a database search system with multiple index partitions, according to some embodiments of the technology described herein.

FIG. 3 illustrates operation of a database search system with multiple index partitions, according to some embodiments of the technology described herein. As shown in FIG. 3, the database includes multiple data partitions 302A, 302B. In the example of FIG. 3, each of the data partitions 302A, 302B is stored on a replica set, as indicated by the three circles in each data partition. The circles may represent database management nodes of a replica set (e.g., a primary database management node and two secondary database management nodes of the replicate set).

In the example embodiment of FIG. 3, the database search system includes index partition 306A and index partition 306B. Index partition 306A may be an index for the data stored in data partition 302A and index partition 306B may be an index for the data stored in data partition 302B. Although in the example of FIG. 3 the database search system includes an index partition for each data partition, in some embodiments, the database search system may include a different number of index partitions than data partitions. For example, the database may include two data partitions while the database search system has three index partitions. As another example, the database may store data in a single partition and the database search system may have multiple index partitions. Accordingly, the database search system may partition an index at a different granularity than the data.

As shown in FIG. 3, each index partition 306A is used by a respective set of query management nodes. Index partition 306A is used by query management nodes 308A, 308B and index partition 306B is used by query management nodes 308C, 308D. Each set of query management nodes may be configured to perform queries targeting data indexed by the respective index partition of the set of query management nodes. For example, query management nodes 308A, 308B may be configured to perform queries targeting data indexed by index partition 306A (e.g., data stored in data partition 302A) and query management nodes 308C, 308D may be configured to perform queries targeting data indexed by index partition 306B (e.g., data stored in data partition 302B).

In some embodiments, the query routing module 106 may include a router for each index partition. The query routing module 106 may determine which index partition(s) are to be searched to execute a query, identify router(s) associated with the index partition(s), and use the router(s) to route the query to query management node(s).

Figure 4:
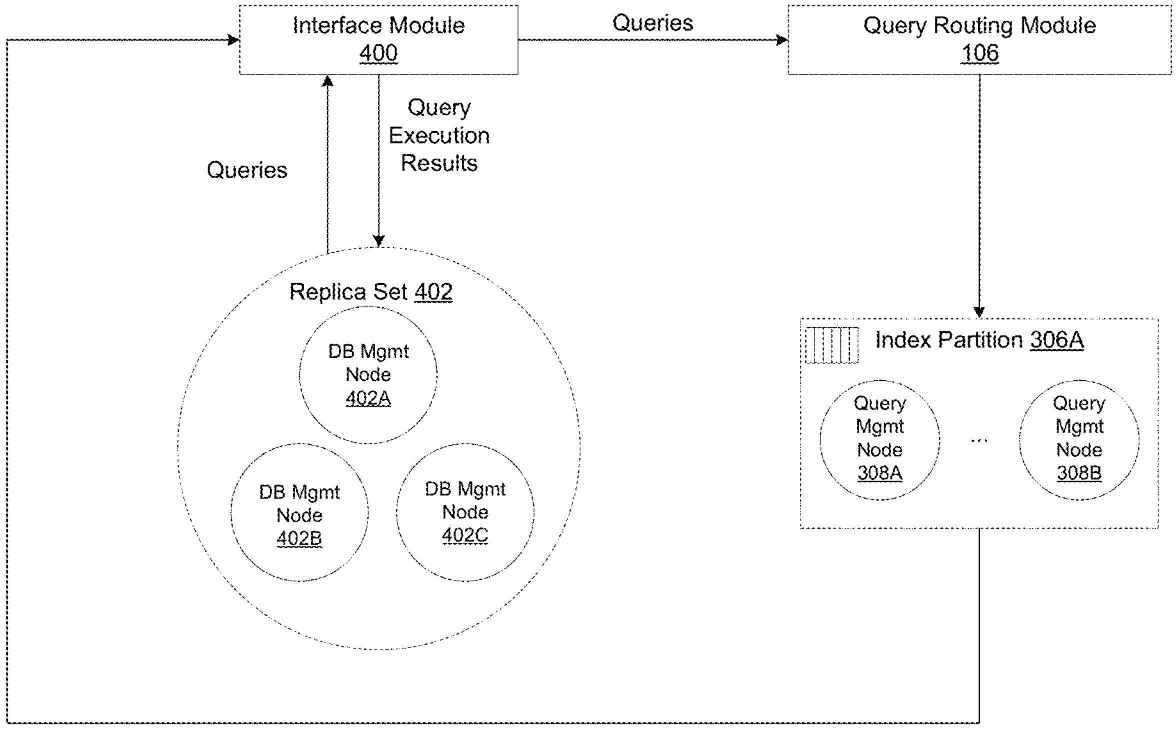
FIG. 4 illustrates a database search system independently partitions for a cluster, according to some embodiments of the technology described herein.

FIG. 4 illustrates a dataflow of database search system that uses index partitions, according to some embodiments of the technology described herein. As shown in FIG. 4, an interface module 400 (e.g., a mongos in a MongoDB database system) is configured to receive queries from database management nodes 402A, 402B, 402C of the replica set 402. For example, the replica set 402 may store a data partition of a database system. The interface module 400 transmits queries to a query routing module 106. The query routing module 106 routes the queries to a set of query management nodes 308A, 308B associated with the index partition 306A. The query management nodes 308A, 308B are configured to provide query execution results to the interface module 400. The query management nodes 308A, 308B may further provide indications of data updates to the interface module 400 (e.g., by providing a change stream).

As shown in FIG. 4, the interface module 400 transmits query execution results to database management nodes of the replica set 402. For example, the interface module 400 may transmit identifiers of data objects (e.g., data objects) stored in the replica set 402. The information may be used to retrieve the data objects (e.g., to provide to a client in response to a query).

Figure 5:
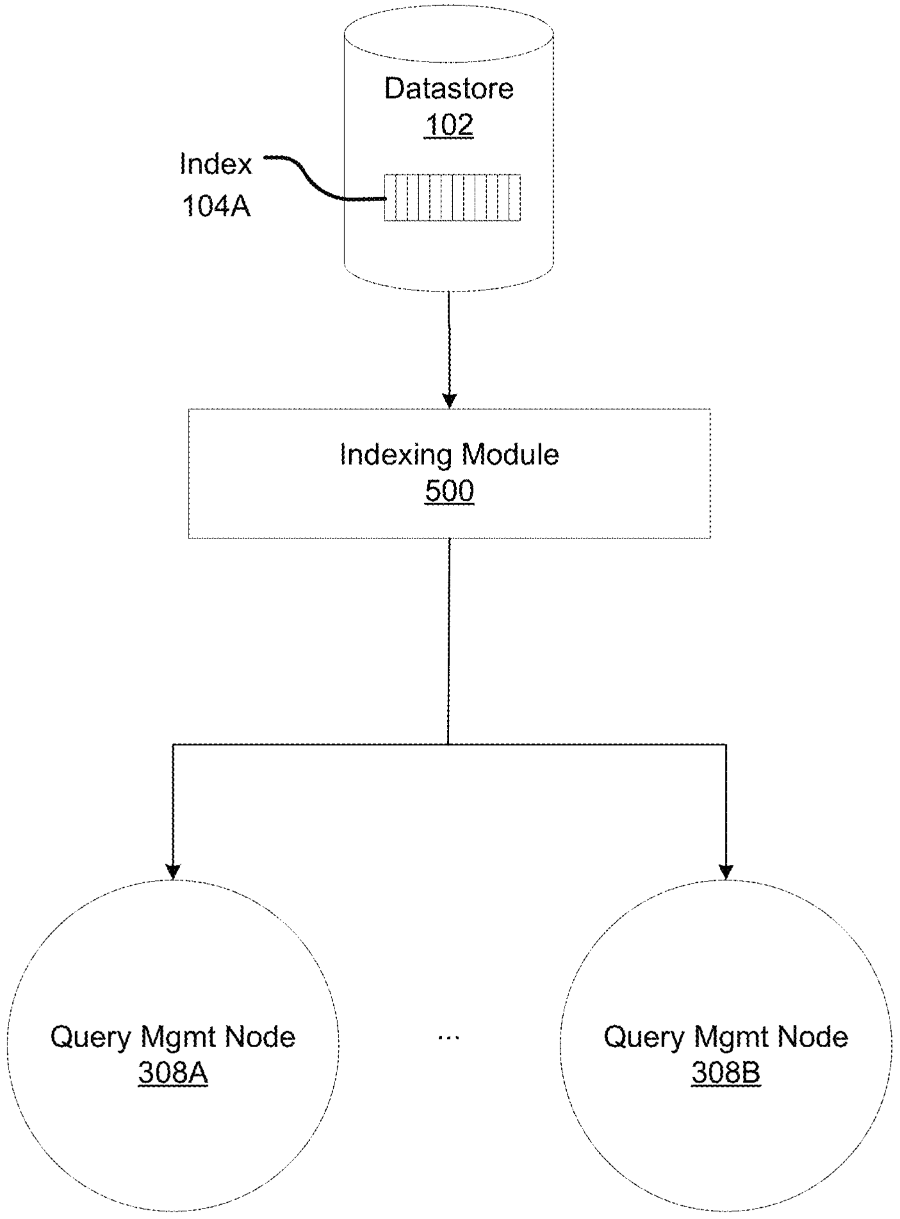
FIG. 5 illustrates indexing operation performed by a database search system, according to some embodiments of the technology described herein.

FIG. 5 illustrates index replication performed by a database search system (e.g., database search system 100), according to some embodiments of the technology described herein. As shown in FIG. 5, an indexing module 500 replicates an index 104A to query management nodes 308A, 308B. For example, the indexing module 500 may execute an indexing mongot instance in a MondoDB system that replicates an index or index partition to query execution mongot instances.

In some embodiments, the indexing module 500 may provide an indication of updates to the index 104A to an interface module (e.g., interface module 400 described herein with reference to FIG. 4). For example, the indexing module 500 may transmit, to the interface module, an indication of an addition or removal of entries in the index 104A, addition or removal of an index field, and/or other updates. The indication of the updates may be used by the interface module 400 to maintain up to date information about the index 104A. For example, the information may be used in routing queries.

Figure 6:
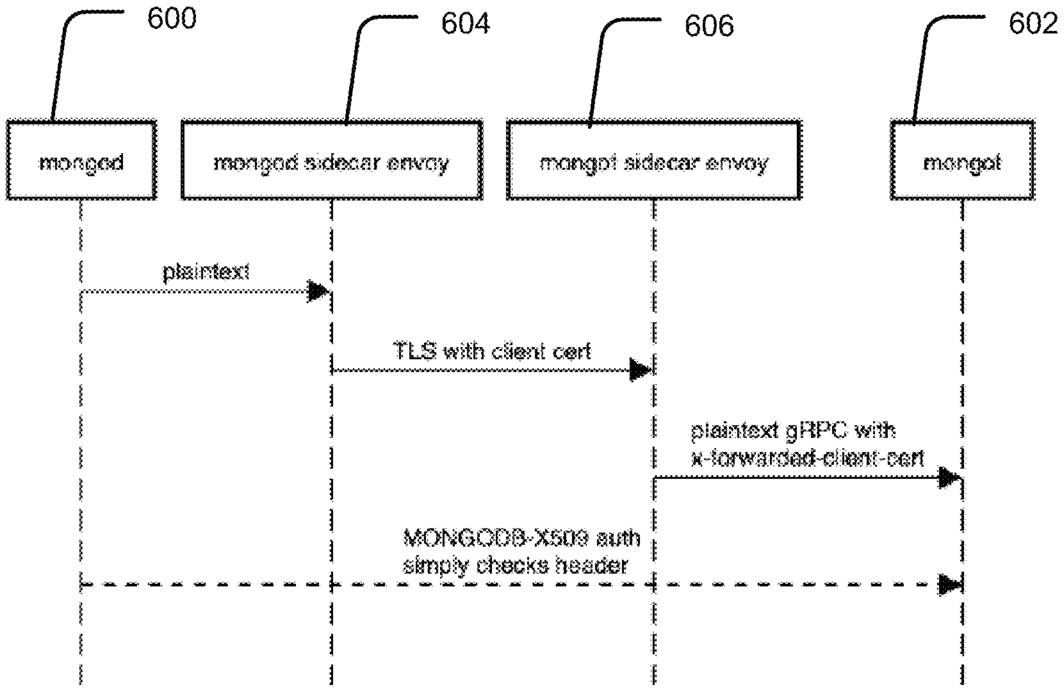
FIG. 6 is an example process of searching for data in a database, according to some embodiments of the technology described herein.

FIG. 6 illustrates an example of how a database management node (e.g., executing a mongod instance in a MongoDB database system) 600 may communicate with a query management node (e.g., executing a mongot instance) 602, according to some embodiments of the technology described herein. The communication may include authentication mechanisms. The mongod instance may transmit a plaintext query to a mongo sidecar envoy 604. The mongod sidecar envoy 604 may transmit transport later security (TLS) client certificate to a mongot sidecar envoy 606. Some embodiments use the envoy already running on the mongod host(s)/. The mongot sidecar envoy 606 transmits a plaintext Google remote procedure call (gRPC) with an x-forwarded client certificate to the mongot instance. The mongod instance further transmits a mongodb x.509 authentication certificate to the mongot instance.

In some embodiments, the database system may speak gRPC to the database search system. In some embodiments, the database search system may build an envoy plugin. Some embodiments use envoy as a level 4 proxy. Some embodiments include a custom envoy plugin to transcode the relevant small subjects of a MongoDB to gRPC, and use envoy as an L7 load balancer.

Figure 7:
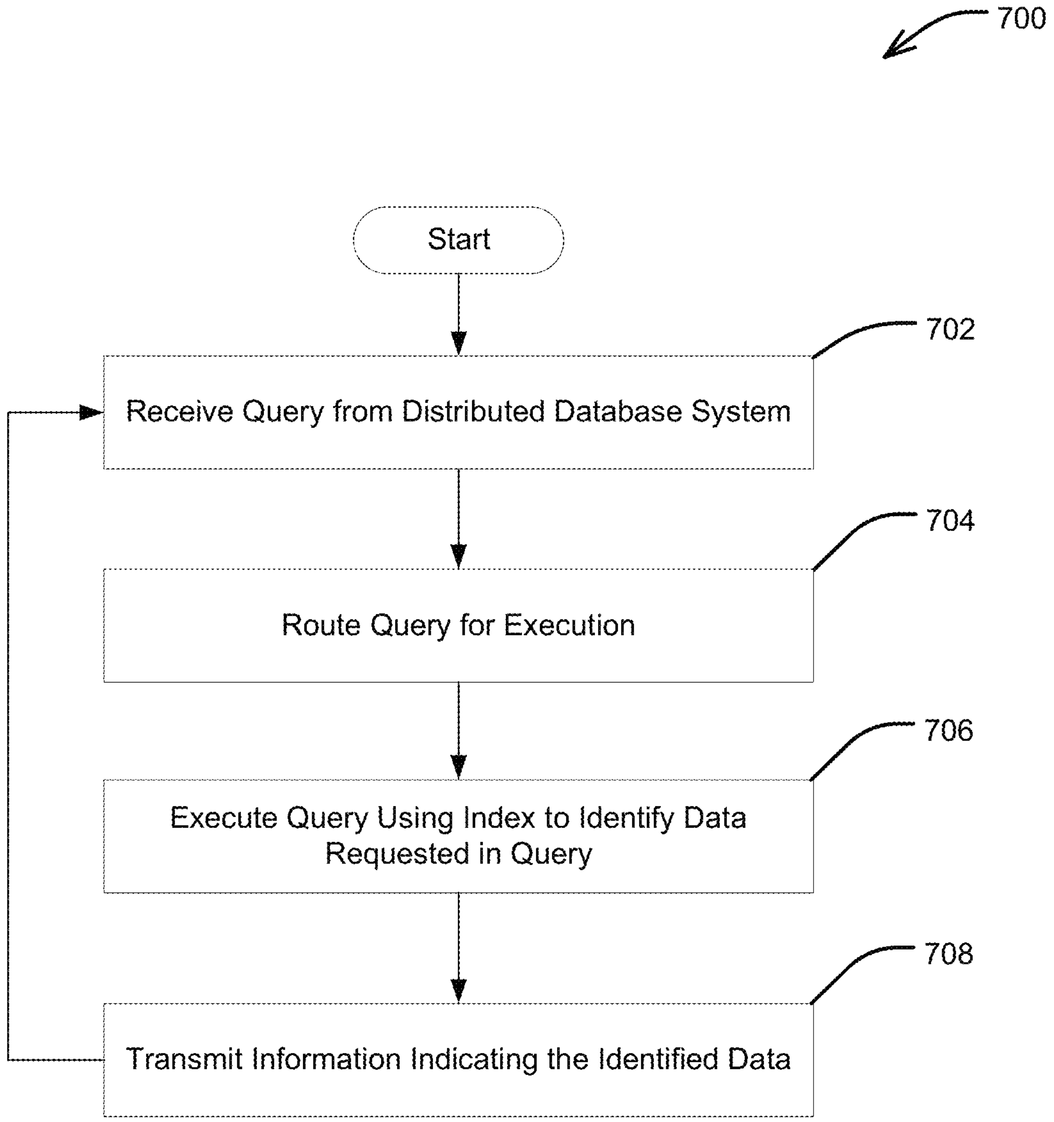
FIG. 7 is an example process for processing queries by a distributed database system, according to some embodiments of the technology described herein.

FIG. 7 is an example process 700 of searching for data in a database, according to some embodiments of the technology described herein. In some embodiments, process 700 may be performed by the database search system 100 described herein with reference to FIG. 1. For example, process 700 may be performed to execute one or more queries transmitted to the database search system 100 from database management nodes 122A, 122B, 122C of the distributed database system 120 described herein with reference to FIG. 1.

Process 700 begins at block 702, where the system receives a query from a distributed database system. For example, the system may receive a query from a database management node, where the query requests at least some data stored in a datastore (e.g., a shard and/or replica dataset) managed by the database management node. In some embodiments, the system may be configured to receive the query through an application program interface (API). For example, the query may be executable instructions including various operators specifying parameters of the query. An illustrative query is shown below.

```
db.movies.aggregate([
  {
    $search: {
      "text": {
        "query": "baseball",
```

-continued

```
        "path": "plot"
      }
    }
  },
  {
    $limit: 5
  },
  {
    $project: {
      "_id": Θ,
      "title": 1,
      "plot": 1
    }
  }
])
```

The above example query requests, from a database storing data records (e.g., documents) associated with movies, a title and a plot of 5 movies that include the word "baseball" in a plot field of a data record associated with the movie.

Next, process 700 proceeds to block 704, where the system routes the query for execution. In some embodiments, the system performing process 700 may have multiple components (e.g., processes) that are configured to execute queries (e.g., query management nodes 108A, 108B, 108C described herein with reference to FIG. 1). The system may route the query to one or more components for execution. For example, the system may route the query to a module that is configured with an index of data stored in a portion of the database.

In some embodiments, the system may be configured to route the query based on the availability of the components. For example, the system may identify a particular module to execute the query, determine that the identified module is unavailable (e.g., due to a network communication error or because the module is executing another query), and transmit the query to another module when it is determined that the originally identified module is unavailable. In some embodiments, the system may be configured to distribute a query processing load among multiple components. For example, the system may transmit the query to maintain a target distribution of query processing across multiple components.

Next, process 700 proceeds to block 706, where the system executes the query using an index to identify data requested in the query. The system may be configured to execute the query using a module that the query was routed to at block 704. The system may be configured to search for data in the index matching criteria indicated by the parameters of the query. The system may be configured to determine information (e.g., identifier(s)) identifying the data that matches the criteria of the query. For example, the system may identify identity field values of documents that match the criteria of the query. Continuing with the example query above, the index may store a value of a plot field from documents of a datastore in the distributed database system. The system may search for the word "baseball" in the indexed plot field values to identify five documents for which the plot field includes the word "baseball". The system may determine the identifiers of the five documents (e.g., values of the _Id field of the five documents).

In some embodiments, the system may be configured to execute a search for data using processing hardware separate from that of the distributed database system. Moreover, the index it uses may be stored in storage hardware separate from the storage hardware of data stored by the distributed database system. Accordingly, the system may be configured to use one or more of its processors to search an index stored in its memory.

Next, process 700 proceeds to block 708, where the system transmits information indicating data identified from executing the query to the distributed database system. In some embodiments, the system may be configured to transmit the information to a database management node from which the query was received by the system. For example, the system may transmit document identifiers to the database management node for use in aggregating documents to provide to a client device. The information may be used by the distributed database system to aggregate data requested in the query, and then provided to a client device. Below is an example set of results that may be returned to a client device from executing the above-described example query for documents associated with respective movies that include the word "baseball" in a plot field of the documents.

```
{
  "plot" : "A trio of guys try and make up for missed
  opportunities in childhood by forming a three-player
  baseball team to compete against standard children
  baseball squads.",
  "title" : "The Benchwarmers"
}
{
  "plot" : "A young boy is bequeathed the ownership of a
  professional baseball team.",
  "title" : "Little Big League"
}
{
  "plot" : "A trained chimpanzee plays third base for a
  minor-league baseball team.",
  "title" : "Ed"
}
{
  "plot" : "The story of the life and career of the famed
  baseball player, Lou Gehrig.",
  "title" : "The Pride of the Yankees"
}
{
  "plot" : "Babe Ruth becomes a baseball legend but is
  unheroic to those who know him.",
  "title" : "The Babe"
}
```

Figure 8:
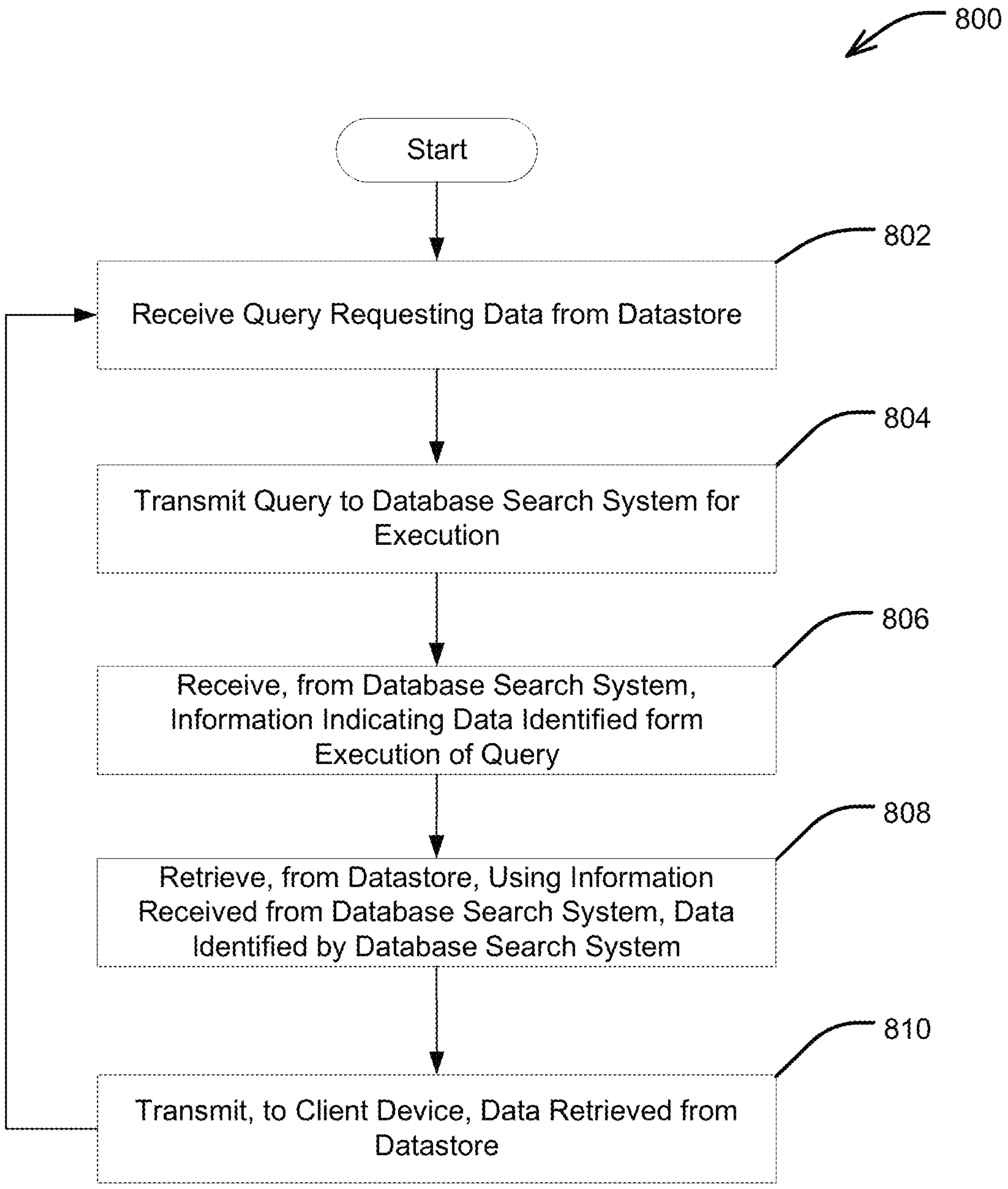
FIG. 8 is an example process for processing queries by a distributed database system, according to some embodiments of the technology described herein.

FIG. 8 is an example process 800 for processing queries by a distributed database system (e.g., distributed database system 120), according to some embodiments of the technology described herein. In some embodiments, process 800 may be performed by the system described herein with reference to FIG. 1. For example, process 800 may be performed to process a query received by one of the database management nodes 122A, 122B, 122C from one of the client devices 110 described herein with reference to FIG. 1. The database system may include first computer hardware that comprises a datastore storing data. The database system may include one or more datastores. In some embodiments, the datastore(s) may be managed by respective database management node(s). For example, the datastore(s) may comprise multiple datastores of a replicate set, where each datastore is managed by a respective database management node.

Process 800 begins at block 802, where the system performing process 800 receives a query requesting data from a datastore of the database system. In some embodiments, the query may be received by a database management node (e.g., of a replica set) from a client device. For example, the query may be received by a database management node of a replica set of a MongoDB database. The query may be a request for data objects (e.g., documents) matching a set of one or more criteria. In some embodiments, the system may be configured to receive the query through a communication network (e.g., the Internet). For example, the system may receive the query from a client device through the Internet.

Next, process 800 proceeds to block 804 where the system transmits the query to a database search system for execution. The system may transmit the query to second computer hardware for execution. The second computer hardware is different from the first computer hardware comprising the datastore(s). In some embodiments, the second computer hardware may be configured to execute a database search system (e.g., database search system 100). The database search system may execute the query (e.g., by performing process 700 described herein with reference to FIG. 7).

In some embodiments, the second computer hardware may execute a database search system configured to execute queries. The second computer hardware may comprise hardware that provides improved data search efficiency relative to the first computer hardware comprising the datastore. For example, the second computer hardware may more efficiently execute scatter-gather operations that may be involved in searching memory for data than the first computer hardware. In some embodiments, the second computer hardware may further be scaled independently of the first computer hardware. The second computer hardware may be scaled as needed for searching functionality whereas the first computer hardware may be scaled as needed for storage and management of data.

In some embodiments, the database search system may be configured to execute multiple query management nodes and the database search system may route the query to one of the query management nodes. For example, the database search system may identify an available query management node for execution of the query. As another example, the database search system may identify a query management node associated with the datastore (e.g., associated with a data partition stored in the datastore) for execution of the query and transmit the query to the query management node for execution. As another example, the database search system may identify a query management node that indexes data stored in the datastore and transmit the query to the query management node for execution. As another example, the database search system may identify a query management node by balancing processing load across the query management nodes, and transmit the query to the identified query management node.

Next, process 800 proceeds to block 806, where the system receives, from the second computer hardware (e.g., executing the database search system), information indicating data identified from execution of the query. The information may include information identifying the data in the datastore. For example, the information may include values of a particular field (e.g., _id field) identifying one or more data objects (e.g., document(s)). As another example, the information may include values identifying rows in a table. In some embodiments, the information may include an indication of updates made to the datastore from execution of the query. For example, the information may include a change stream indicating updates to the datastore made from execution of the query.

Next, process 800 proceeds to block 808, where the system retrieves, from the datastore, using the information received at block 806, the data identified from execution of the query. The system may read the data from memory of the first computer hardware. For example, the system may retrieve one or more data objects (e.g., documents) stored in the memory using the information. As another example, the system may receive values from one or more rows of a table stored in the memory using the information. After block 808, process 800 proceeds to block 810, where the system transmits the retrieved data to the client device.

Example Applications

Some embodiments may be used for medical and financial records reconciliation. Record reconciliation often brings complex filtering and sorting requirements rather than scoring. Lucene-based systems are well-suited for this workload type when scaled effectively.

Some embodiments parallelize the Lucene indexing process to support a very high indexing throughput, usually sharding the Lucene index by 8-24x. The records tend to be electronically generated and the queries are often at a constant rate. These workloads often require shard targeting on reads because of how many shards are needed on the indexing side. Users often need to sort at query time on an arbitrary set of fields. The MongoDB aggregation pipeline, when optimized for working with $search, unlocks new capabilities and advantages when compared to Elasticsearch and SOLR because our sorting semantics are more extensible. Some embodiments have high availability.

Some embodiments may be used for set-top box and/or a streaming service search. Set-top box/Streaming service search is a demanding workload that is usually about function scores and filtered search. Some embodiments have high availability.

Some embodiments may be used for filtering a large number of fields for promotions and/or personalization. Some embodiments provide a flexible data model. As a transactional database, the cost of maintaining an index for a document field can be limited. Some embodiments isolate query database management nodes and indexing database management nodes. For example, there may be between 20+ queries per second and over 2,000 queries per second. This query is machine-generated and powers a lot of real estate in an ecommerce experience for a retailer. Some embodiments provide high availability.

Some embodiments may be used for catalog search and inventory management. Product Catalog Search & Product Inventory Management is a broad category of use case to describe trying to surface relevant products for the management or promotion of those products. Some embodiments read workloads and scale independently and quickly. Some embodiments may use small replicas vs a few large database management nodes. Some embodiments have high availability. Catalog search often involves a data model where many attributes about a product are nested. In some embodiments, nested documents may be indexed as individual Lucene documents. Some embodiments approach a 2 billion document limit. Some embodiments may partition independently from the distributed database.

Some embodiments may be used for warranty management. Warranty management in the manufacturing industry (e.g., automotive manufacturing industry) is operationally challenging and expensive. These manufacturers overwhelmingly rely on database technologies if they have built custom applications for these workloads, and search engines if they have adopted a commercial off-the-shelf CMS. In some embodiments, read-centric workloads scale independently and quickly. Some embodiments use small replicas vs a few large database management nodes.

Some embodiments may be used for audit log search. Some embodiments parallelize the Lucene indexing process to support a very high indexing throughput, usually sharding by 8-24x. The records may be electronically generated and the queries may be a constant rate. Some embodiments use shard targeting because of how many shards are needed on the indexing side. Some embodiments include a search specific API role given their security posture and need to provision least access.

Some embodiments may be used for a single-view/search across data stored in multiple data sources. Users will often be bringing data from other databases in this use case because a search engine offers the most accessible interface. Some embodiments parallelize the database search system's indexing process to support a very high indexing throughput, usually sharding by 8-24x. In some embodiments, the records are electronically generated and the queries are at a constant rate. Some embodiments use shard targeting because of how many shards are needed on the indexing side. Some embodiments provide sufficient sort performance at query time.

Some embodiments service queries with no expected downtime. In some embodiments, if a query fails due to a network error or some other issue, the cluster is resilient to such failures. Scale storage, indexing, and query loads separately from a database. In some embodiments, the database search system may scale independent of database cluster changes. Scale out indexing throughput. In some embodiments, indexing is parallelized. Scale query load independently from indexing load.

In some embodiments, the read workload may be scaled as needed without consideration of the indexing load, such that indexing has no impact on "red-line QPS." In some embodiments, the database search system scales as needed without human intervention. Some embodiments perform automatic partitioning and/or sharding. Some embodiments reduce search clusters for decreased performance based on their requirements.

Example Computer System

Figure 9:
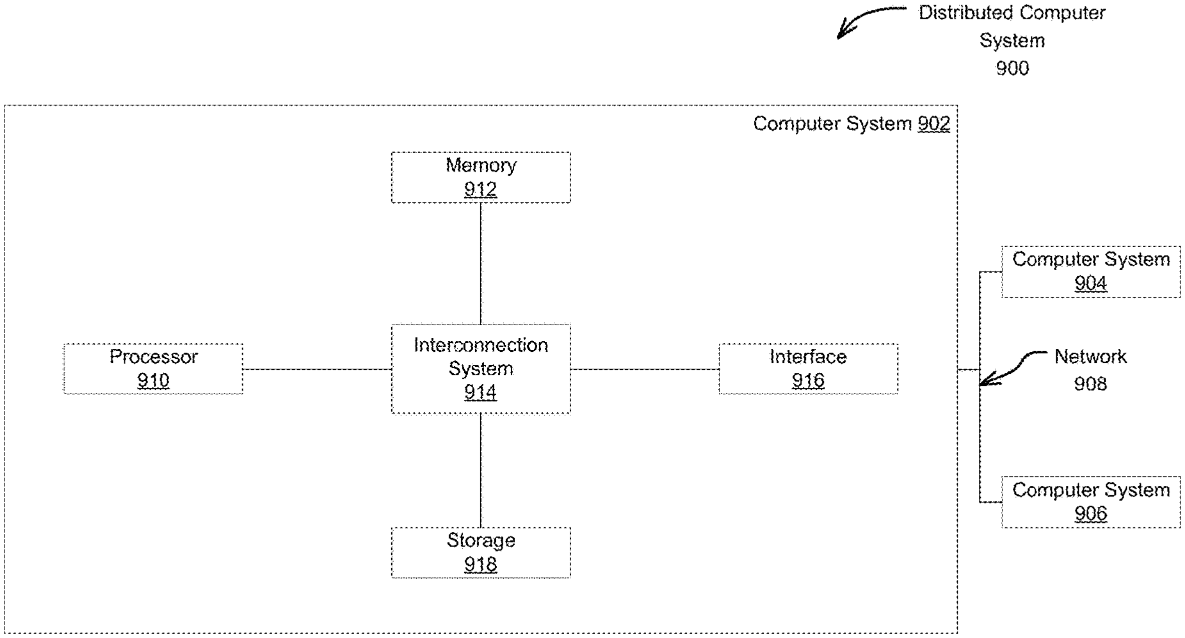
FIG. 9 is a block diagram of a distributed computer system that may be used to implement some embodiments of the technology described herein.

FIG. 9, shows a block diagram of a specially configured distributed computer system 900, in which some embodiments of the technology described herein can be implemented. As shown, the distributed computer system 900 includes one or more computer systems that exchange information. More specifically, the distributed computer system 900 includes computer systems 902, 904, and 906. As shown, the computer systems 902, 904, and 906 are interconnected by, and may exchange data through, a communication network 908. The network 908 may include any communication network through which computer systems may exchange data. To exchange data using the network 908, the computer systems 902, 904, and 906 and the network 908 may use various methods, protocols, and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS8, JSON, SOAP, CORBA, REST, and Web Services. To ensure data transfer is secure, the computer systems 902, 904, and 906 may transmit data via the network 908 using a variety of security measures including, for example, SSL or VPN technologies. While the distributed computer system 900 illustrates three networked computer systems, the distributed computer system 900 is not so limited and may include any number of computer systems and computing devices, networked using any medium and communication protocol.

As illustrated in FIG. 8, the computer system 902 includes a processor 910, a memory 912, an interconnection element 914, an interface 916 and data storage element 918. To implement at least some of the aspects, functions, and processes disclosed herein, the processor 910 performs a series of instructions that result in manipulated data. The processor 910 may be any type of processor, multiprocessor, or controller. Example processors may include a commercially available processor such as an Intel Xeon, Itanium, Core, Celeron, or Pentium processor; an AMD Opteron processor; an Apple A8 or A5 processor; a Sun UltraSPARC processor; an IBM Power5+ processor; an IBM mainframe chip; or a quantum computer. The processor 910 is connected to other system components, including one or more memory devices 912, by the interconnection element 914.

The memory 912 stores programs (e.g., sequences of instructions coded to be executable by the processor 910) and data during operation of the computer system 902. Thus, the memory 912 may be a relatively high performance, volatile, random access memory such as a dynamic random access memory ("DRAM") or static memory ("SRAM"). However, the memory 912 may include any device for storing data, such as a disk drive or other nonvolatile storage device. Various examples may organize the memory 912 into particularized and, in some cases, unique structures to perform the functions disclosed herein. These data structures may be sized and organized to store values for particular data and types of data.

Components of the computer system 902 are coupled by an interconnection element such as the interconnection mechanism 914. The interconnection element 914 may include any communication coupling between system components such as one or more physical busses in conformance with specialized or standard computing bus technologies such as IDE, SCSI, PCI, and InfiniBand. The interconnection element 914 enables communications, including instructions and data, to be exchanged between system components of the computer system 902.

The computer system 902 also includes one or more interface devices 916 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 902 to exchange information and to communicate with external entities, such as users and other systems.

The data storage element 918 includes a computer readable and writeable nonvolatile, or non-transitory, data storage medium in which instructions are stored that define a program or other object that is executed by the processor 910. The data storage element 918 also may include information that is recorded, on or in, the medium, and that is processed by the processor 910 during execution of the program. More specifically, the information may be stored in one or more data structures specifically configured to conserve storage space or increase data exchange performance. The instructions may be persistently stored as encoded signals, and the instructions may cause the processor 910 to perform any of the functions described herein. The medium may, for example, be optical disk, magnetic disk, or flash memory, among others. In operation, the processor 910 or some other controller causes data to be read from the nonvolatile recording medium into another memory, such as the memory 912, that allows for faster access to the information by the processor 910 than does the storage medium included in the data storage element 918. The memory may be located in the data storage element 918 or in the memory 912, however, the processor 910 manipulates the data within the memory, and then copies the data to the storage medium associated with the data storage element 918 after processing is completed. A variety of components may manage data movement between the storage medium and other memory elements and examples are not limited to particular data management components. Further, examples are not limited to a particular memory system or data storage system.

Although the computer system 902 is shown by way of example as one type of computer system upon which various aspects and functions may be practiced, aspects and functions are not limited to being implemented on the computer system 902 as shown in FIG. 8. Various aspects and functions may be practiced on one or more computers having a different architectures or components than that shown in FIG. 8. For instance, the computer system 902 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 902 may be a computer system including an operating system that manages at least a portion of the hardware elements included in the computer system 902. In some examples, a processor or controller, such as the processor 910, executes an operating system. Examples of a particular operating system that may be executed include a Windows-based operating system, such as, Windows 8 or 11 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 910 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, Java, C++, C#(C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML, or other formats, when viewed in a window of a browser program, can render aspects of a graphical-user interface, or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Having thus described several aspects of at least one embodiment of the technology described herein, it is to be appreciated that various alterations, modifications, and improvements will readily occur to those skilled in the art.

Such alterations, modifications, and improvements are intended to be part of this disclosure, and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. As used herein, the term "computer-readable storage medium" encompasses only a non-transitory computer-readable medium that can be considered to be a manufacture (i.e., article of manufacture) or a machine. Alternatively, or additionally, aspects of the technology described herein may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but may be distributed in a modular fashion amongst a number of different computers or processors to implement various aspects of the technology described herein.

Computer-executable instructions may be in many forms, such as program components, executed by one or more computers or other devices. Generally, program components include routines, programs, objects, components, data structures, etc. that perform particular tasks or implement particular abstract data types. Typically, the functionality of the program components may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIGS. 3 and 7. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by an "actor" or a "user." It should be appreciated that an "actor" or a "user" need not be a single individual, and that in some embodiments, actions attributable to an "actor" or a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A database search system for searching for data in a distributed database separate from the database search system, the distributed database comprising a plurality of database management nodes and one or more datastores storing data, the plurality of database management respective configured to manage the data stored by the distributed database, the database search system comprising:

at least one memory separate from the one or more datastores of the distributed database, the at least one memory configured to store at least one index for the data stored by the distributed database, the at least one index comprising values of at least one field in the data;

at least one processor separate from one or more processors of the plurality of database management nodes;

a plurality of query management nodes executed by the at least one processor, the plurality of query management nodes each configured to:

receive, from the query routing module, a query received by one of the plurality of database management nodes from a client device targeting data stored by the distributed database;

process the query, the processing comprising:

identify, using the at least one index, the data targeted by the query stored by the distributed database; and transmit, to at least one database management node of the plurality of database management nodes, information for locating the data targeted by the query in the one or more datastores of the distributed database system; and a query routing module executed by the at least one processor, the query routing module configured to:

receive queries, from the plurality of database management nodes, that were received by the plurality of database management nodes from one or more client devices; and route each of the queries to at least one of the plurality of query management nodes for execution.

2. The system of claim 1, wherein each of the plurality of query management nodes is configured to execute queries using at least one virtual machine (VM).

3. The system of claim 2, wherein the at least one virtual machine is at least one compute-optimized VM.

4. The system of claim 1, wherein the database search system comprises an index construction module executed by the at least one processor, the index construction module configured to:

construct the at least one index stored in the at least one memory; and update the at least one index based on updates to values of the at least one field in the data stored by the distributed database.

5. The system of claim 1, wherein the query routing module is further configured to perform load balancing of query processing across the plurality of query management nodes.

6. The system of claim 1, wherein the query routing module is further configured to:

receive a first query from a first database management node of the plurality of database management nodes;

identify a first one of the plurality of query management nodes to execute the first query;

determine that the first query management node does not have a processing bandwidth designated for execution of the first query; and route the first query to a second one of the plurality of query management nodes in response to determining that the first query management node does not have the processing bandwidth designated for execution of the first query.

7. The system of claim 1, wherein the one or more datastores of the distributed database store a plurality of replicated datasets each managed by a respective one of the plurality of database management nodes.

8. The system of claim 1, wherein the one or more datastores of the distributed database store a plurality of data partitions each managed by a respective one of the plurality of database management nodes.

9. The system of claim 1, further comprising a plurality of processors including the at least one processor, the plurality of processors distributed across multiple geographic regions, and each of the query management nodes is configured for execution by one or more processors in a respective one of the multiple geographic regions.

10. A method for searching for data in a distributed database using a database search system separate from the distributed database, the distributed database comprising a plurality of database management nodes and one or more datastores storing data, the plurality of database management nodes configured to manage the data stored by the distributed database, the method comprising:

receiving, by a query routing module executed by at least one processor of the database search system, separate from one or more processors of the plurality of database management nodes, queries from the plurality of database management nodes, the queries having been received by the plurality of database management nodes from one or more client devices;

routing, by the query routing module, each of the queries to at least one of a plurality of query management nodes executed by the at least one processor of the database search system;

executing, by the at least one query management node, the queries to identify data targeted by the queries stored by the distributed database; and transmitting, by the at least one query management node, to at least one of the plurality of database management nodes, information for locating the data targeted by the query in the one or more datastores of the distributed database.

11. The method of claim 10, wherein executing, using the at least one query management node, the queries to identify data targeted by the queries stored by the distributed database comprises executing the queries using at least one virtual machine (VM).

12. The method of claim 11, wherein executing the queries using the at least one VM comprises executing the queries using at least one compute-optimized VM.

13. The method of claim 10, further comprising:

constructing, by an index construction module executed by the at least one processor, at least one index stored in at least one memory separate from the one or more datastores of the distributed database; and updating, by the index construction module, the at least one index based on updates to at least one field in the data stored by the distributed database.

14. The method of claim 10, further comprising performing, by the query routing module, load balancing of query processing across the plurality of query management nodes.

15. The method of claim 10, further comprising performing, by the query routing module:

receiving a first query from a first database management node of the plurality of database management nodes;

identifying a first one of the plurality of query management nodes to execute the first query;

determining that the first query management node does not have a processing bandwidth designated for execution of the first query; and routing the first query to a second one of the plurality of query management nodes in response to determining that the first query management node does not have the processing bandwidth designated for execution of the first query.

16. A non-transitory computer-readable storage medium storing instructions that, when executed by at least one processor, causes the at least one processor of a database search system to perform a method of searching for data hosted by a distributed database separate from the database search system, the at least one processor being separate from one or more processors of the distributed database, the distributed database comprising a plurality of database management nodes and one or more datastores storing data, the plurality of database management nodes configured to manage the data stored by the distributed database, the method comprising:

receiving, by a query routing module of the database search system, queries from the plurality of database management nodes of the distributed database, the queries having been received by the plurality of database management nodes from one or more client devices;

routing, by the query routing module, each of the queries to at least one of a plurality of query management nodes of the database search system;

executing, by the at least one query management node, the queries to identify data targeted by the queries that is stored by the distributed database; and transmitting, by the at least one query management node, to at least one of the plurality of database management nodes, information for locating the data targeted by the query in the one or more datastores of the distributed database.

17. The non-transitory computer-readable storage medium of claim 16, wherein executing, by the at least one query management node, the queries to identify data targeted by the queries stored by the distributed database comprises executing the queries using at least one virtual machine (VM).

18. The non-transitory computer-readable storage medium of claim 17, wherein executing the queries using the at least one VM comprises executing the queries using at least one compute-optimized VM.

19. The non-transitory computer-readable storage medium of claim 16, wherein the method further comprises:

constructing at least one index stored in at least one memory separate from the one or more datastores of the distributed database; and updating the at least one index based on updates to at least one field in the data stored by the distributed database.

20. The non-transitory computer-readable storage medium of claim 16, wherein the method further comprises, by the query routing module:

receiving a first query from a first database management node of the plurality of database management nodes;

identifying a first one of the plurality of query management nodes to execute the first query;

determining that the first query management node does not have a processing bandwidth designated for execution of the first query; and routing the first query to a second one of the plurality of query management nodes in response to determining that the first query management node does not have the processing bandwidth designated for execution of the first query.

* * * * *